Patented Oct. 24, 1922.

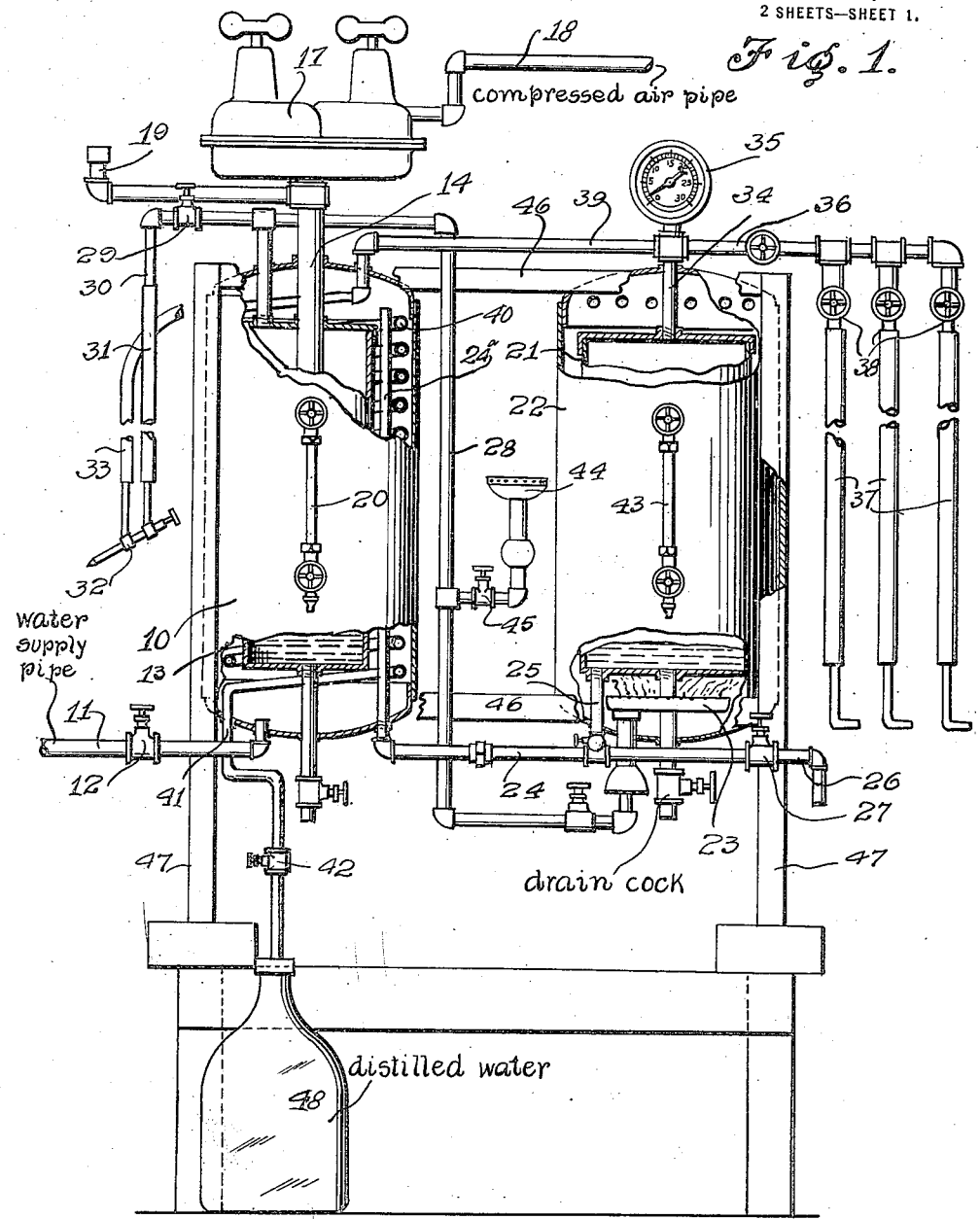

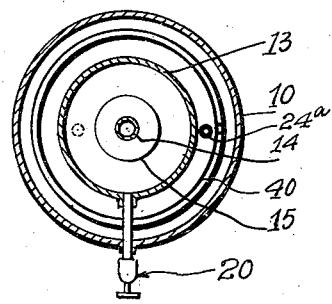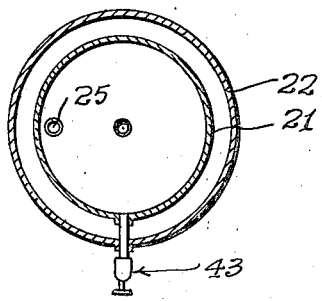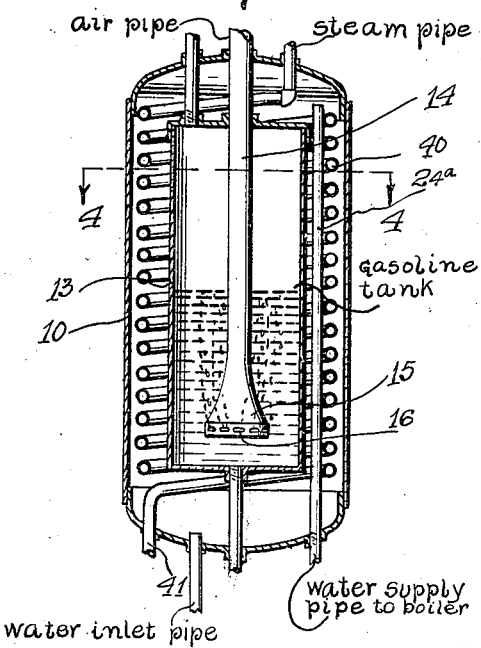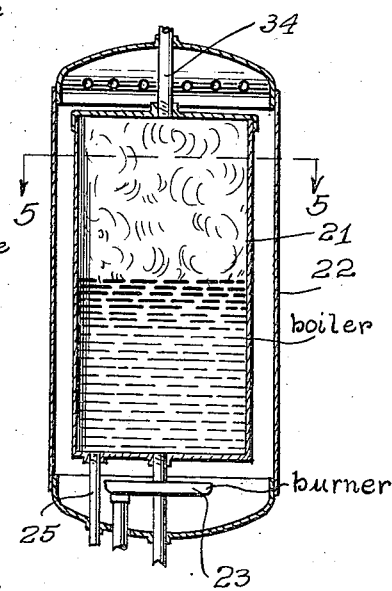

1,433,055

UNITED STATES PATENT OFFICE.

ELMER R. WILLIAMS, OF SPRINGFIELD, MISSOURI.

COMBINED STEAMER, STILL, AND BURNER FOR BATTERY REPAIRING.

Application filed July 15, 1922. Serial No. 575,401.

*To all whom it may concern:*

Be it known that I, ELMER R. WILLIAMS, a citizen of the United States, residing at Springfield, in the county of Greene and State of Missouri, have invented certain new and useful Improvements in Combined Steamers, Stills, and Burners for Battery Repairing, of which the following is a specification, reference being had to the accompanying drawings.

This invention relates to mechanism for cleaning, repairing and building batteries and like articles, and the general object of the invention is to provide in a single unit means for generating steam, means for distilling water, a heater upon which battery composition may be warmed or melted, and a torch.

In the building and rebuilding or repair of storage batteries, it is necessary to use steam for cleaning out the loose paste from the batteries and to soften the composition on the batteries so that the cells may be taken out of the battery box, and it is further necessary to burn on the lead contacts and for running in composition, and provide means for distilling the water which is to be used in the battery.

A further object of the invention is to provide a structure of this character including a gasoline tank, means for forcing air under relatively low pressure through the gasoline tank in order to impregnate the air with gasoline to form a combustible gas therefrom, and provide a boiler heated by a gasoline burner to generate steam, provide means whereby this steam may be taken off by flexible pipes if desired so as to use the steam for cleaning off loose paste, softening the composition, cleaning out the battery boxes, etc., provide a water condensing coil located around the gasoline tank and within a water jacket into which the steam may be conducted if desired in order to condense the steam to thereby form distilled water to be used for filling battery jars, provide a burner for the boiler to which the gas from the upper portion of the gasoline tank may be carried, provide another burner or heater adapted to be used for heating composition, and provide a torch also connected to the gas chamber above the gasoline inlet tank which may be used for making joints, burning on the lead contacts, or for heating the composition so that it may be run into the battery.

Other objects have to do with the details of construction and arrangement of parts as will appear more fully hereinafter.

My invention is illustrated in the accompanying drawings, wherein:—

Figure 1 is an elevation of an apparatus constructed in accordance with my invention, the gasoline tank, water tank, etc., being broken away;

Figure 2 is a vertical sectional view through the water and gasoline tanks;

Figure 3 is a vertical sectional view through the boiler and the shell surrounding it;

Figure 4 is a section on the line 4—4 of Figure 2;

Figure 5 is a section on the line 5—5 of Figure 3;

In the drawings, I have illustrated a certain embodiment of my invention which has been found very convenient and effective, but I do not wish to be limited to this, as it is obvious that the invention might be embodied in other forms.

Referring to Figure 1, it will be seen that my apparatus consists essentially of a water tank 10 closed at the top and bottom and connected by a pipe 11 to any suitable source of supply, and provided with a valve 12 whereby the supply of water to the tank may be cut off. Disposed within the tank 10 is a gasoline tank 13 constituting a mixing chamber and gas reservoir. Extending down through the top of the tank 10 and into the chamber 13 is an air pipe 14, the lower end of which is outwardly flared, as at 15, and provided with a plurality of openings 16. These openings are disposed below the level of the gasoline in the tank 10.

The upper end of the air pipe 14 is connected to suitable air regulating mechanism, as for instance regulating valves disposed in a casing 17, which regulating valve forms the subject matter of my pending application for patent, Serial #517,876, filed November 26, 1921, and supplied with air from a source of compressed air by a pipe 18. The pipe 14 is also connected to a branch pipe 19 whereby gasoline may be filled into the tank 13. The tank 13 is, of course, provided with a gasoline gauge 20 of any suitable character whereby the level of the gasoline may be determined.

Associated with the tanks 10 and 13 is a boiler 21 designed to contain water, and surrounding this boiler is a jacket 22. A gas burner 23 of any suitable character is disposed in connection with this jacket, this burner being disposed below the lower end of the boiler 21 and acting to heat the water in the boiler 21 to form steam. The boiler 21 is connected by a pipe 24 to an overflow pipe 24ª and thus to the space within the water tank 10, this pipe 24 beyond the branch 25 which connects directly with the boiler having an outlet branch 26 which has a valve 27. The gasoline burner 23 is connected by a pipe 28 to the upper portion of the gasoline tank 13 so that gas generated within the upper portion of the gasoline tank may be taken off through the burner. This pipe 28 is illustrated as connected to the top of the gasoline tank and as having a valve 29 and as also being provided with a branch 30 to which a flexible pipe 31 is connected, this flexible pipe terminating in a plumber's torch or gasoline torch 32. A flexible air pipe 33 connected to a source of oxygen or air under pressure is likewise connected to this torch.

Extending from the upper portion of the boiler is a vertical pipe 34 which extends up through the upper end of the jacket 22 and is connected to a gauge 35. From this pipe 34 extends a branch pipe 36, to which flexible hose 37 are connected, having suitable nozzles thereon. There is a valve 38 for each of these hose so as to cut off or permit the discharge of steam through any one hose. The pipe 34 is also connected by a pipe 39 to a condensing coil 40 disposed within the water tank 10 exterior to the gasoline tank. Thus the water within the tank 10 constitutes a cooling agent whereby the steam in the coil 40 will be condensed and may pass off through the outlet 41 of this coil as distilled water. This pipe 41 is flexible, and a valve 42 is provided for controlling the outward passage of distilled water if desired. The boiler 21 is provided with a gauge glass 43 to show the height of water within the boiler. Connected to the pipe 28 or in any other way connected to the upper portion of the gasoline tank 13 is a burner 44 having a valve 45, this burner being of such form that it will support a vessel containing composition to melt the composition, the burner being also adapted, of course, for other heating purposes.

I have illustrated the jacket 22 with its interior water boiler 21 and the tank 10 with its interior gasoline tank 13 as being mounted upon a supporting frame 46 of any suitable character and having legs 47 whereby it may be supported. This frame is preferably made of angle iron, though other material might be used for the purpose. This supporting frame is mounted upon a lower frame so that the water will flow from the coil 40 into a receptacle, as for instance the carboy 48. Of course, I do not wish to be limited to the particular manner of supporting this apparatus, as other means might be used for the purpose.

The use of this apparatus will be obvious from what has gone before. The tank 13 is partially filled with gasoline, the boiler 21 is partially filled with water, the burner 23 is lighted, and air is forced through the regulating valve, downward through the pipe 14 into the gasoline, where it becomes impregnated with gasoline and forms a combustible vapor which passes out through the pipe 28 to the burner. The steam generated within the boiler 21 is carried off by pipes 34 and 39 to the coil 40 and steam is there condensed to form distilled water. If it be necessary to use the steam for the purpose of cleaning battery jars, cleaning out the loose paste, etc., the steam is allowed to flow through one of the steam hose 37 by means of the valve 38 and may be discharged in a jet against the battery box or other part. The torch is to be used, of course, when it is necessary to burn on a lead contact or to run in composition, or for any other purpose of this character.

I do not wish to be limited to heating the water by a vapor generated by the passage of air through gasoline, as natural or artificial gas might be used in place of gasoline for this purpose. In this case no compressed air is used but the gas flows into the reservoir 13 and this reservoir 13 is simply used to give volume or as an auxiliary tank. 13 in this case is positively filled with water, which acts as a strainer and as a backfire-preventing chamber in using torches. It will be seen that my construction permits the device to be used either as a gasoline vapor generator, where there is no natural gas, or to be used with natural gas or artificial gas when desired.

It will be understood that the regulating valve is connected by the pipe 18 to a main air reservoir and that the regulating valve causes air to pass into the machine at a low pressure. It will be seen that this machine is very convenient, compact, and that it combines apparatus, all parts of which are necessary for use in rebuilding or repairing storage batteries.

I claim:—

1. In an apparatus of the character described, a water tank, a water boiler, a gas burner for heating the boiler and connected to a source of combustible fluid, a condensing coil disposed within the water tank and connected at its upper end to the upper end of the boiler and having an outlet for distilled water, and a torch connected to a source of combustible fluid.

2. In an apparatus of the character described, a water tank, a water boiler, a gas burner for heating the boiler and connected to a source of combustible fluid, a condensing coil disposed within the water tank and connected at its upper end to the upper end of the boiler and having an outlet for distilled water, a torch connected to a source of combustible fluid, and a burner exterior to the water tank, the boiler, and connected to the source of combustible fluid.

3. An apparatus of the character described comprising a water tank, a boiler, means for supplying water to the tank and to the boiler, a reservoir constituting a mixing chamber and disposed within the water tank and adapted to contain combustible fluid, means for forcing air into said mixing chamber, a burner beneath the boiler, a pipe leading from said mixing chamber to the burner and supplying combustible fluid thereto, a torch having a flexible connection to the mixing chamber, a condensing coil disposed within the water tank and surrounding the mixing chamber, said coil being connected at one end to the upper end of the boiler and taking steam therefrom, the coil having an outlet from its other end extending through the water tank, and a flexible steam hose having a valve and connected to the upper portion of the boiler.

4. An apparatus of the character described comprising a water tank, a water boiler, means for supplying water to the tank and to the boiler, a reservoir disposed within the water tank adapted to contain gasoline, the upper portion of the reservoir constituting a mixing chamber, an air pipe extending downward into the lower portion of the gasoline reservoir and perforated at its lower end, the upper end of the air pipe being connected to a source of air under pressure, a coil disposed within the water tank and surrounding the gasoline reservoir and constituting a condenser and connected to the upper end of the boiler, the coil having a discharge outlet leading through the water tank, a burner disposed beneath the boiler and having a supply connection leading to the upper portion of the gasoline reservoir, a torch having a flexible connection to the upper portion of the gasoline reservoir, a burner exterior to the boiler, the water tank having a supply connection to the upper portion of the gasoline reservoir, and a flexible hose having a valved connection to the steam space of the boiler.

5. An apparatus of the character described including a water tank, a boiler, means for supplying water to the tank and to the boiler, a jacket around the boiler, a burner disposed within said jacket and heating the water in the boiler, a gasoline reservoir disposed within the water tank and having its upper portion connected to the burner, an air pipe extending downward through the top of the water tank and into the lower end of the reservoir and having perforations at its lower end, the air pipe being connected to a source of air under pressure and having a regulating valve, a torch having a flexible connection to the upper portion of the gasoline reservoir and having a connection to a source of air under pressure, a jacket surrounding the boiler and the burner, a burner exterior to said jacket and to the water tank and having a supply connection to the upper portion of the gasoline reservoir, a coil disposed within the water tank and surrounding the gasoline reservoir, a pipe connection from the upper end of the boiler to the upper end of the coil, the lower end of the coil being provided with a discharge outlet, and a plurality of hose each having a controlling valve and all connected to the upper end of the boiler.

In testimony whereof I hereunto affix my signature.

ELMER R. WILLIAMS.